E. BROWN.
HAND-RAKE.

No. 172,866. Patented Feb. 1, 1876.

Witnesses:
Granville Lewis
J. McKenny

Inventor:
Edmund Brown
By Hill & Ellsworth
His Atty's

UNITED STATES PATENT OFFICE.

EDMUND BROWN, OF BURLINGTON, VERMONT.

IMPROVEMENT IN HAND-RAKES.

Specification forming part of Letters Patent No. 172,866, dated February 1, 1876; application filed December 31, 1875.

*To all whom it may concern:*

Be it known that I, EDMUND BROWN, of Burlington, in the county of Chittenden and State of Vermont, have invented certain new and useful Improvements in Hand-Rakes; and I do hereby declare the following to be a full and exact description of the same, reference being had to the accompanying drawings, forming part of this specification, in which—

Figure 1:
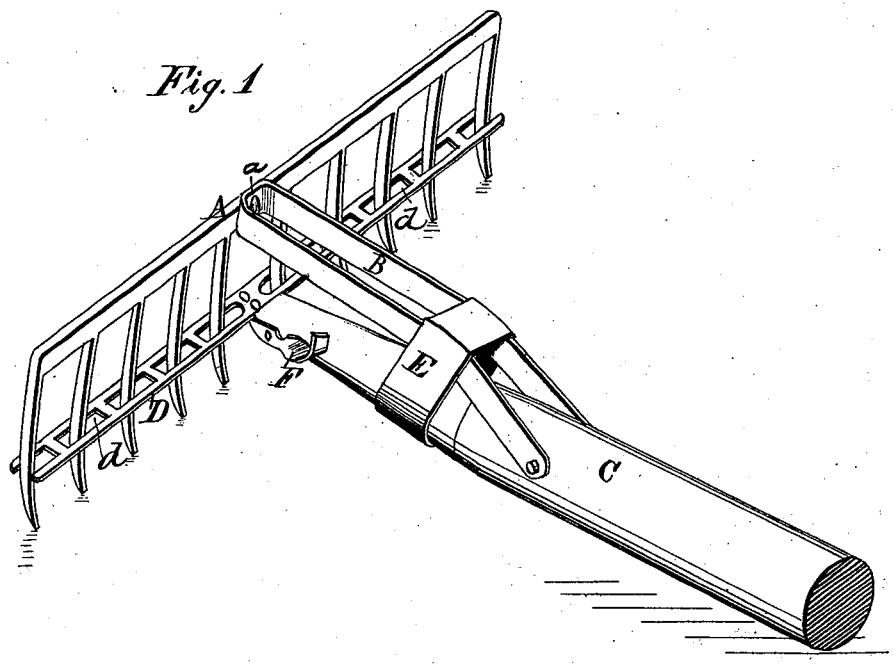
Figure 2:
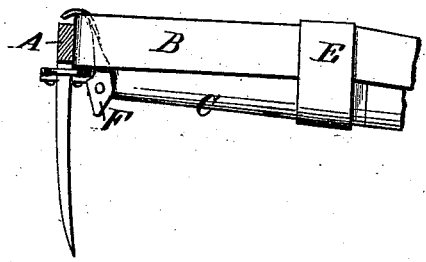
Figure 3:
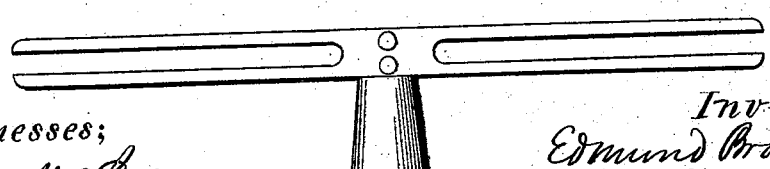

Figure 1 is a perspective view, Fig. 2 a side elevation, partly in section, and Fig. 3 is a view, of a modification of the clearer.

Similar letters of reference in the accompanying drawings denote the same parts.

My present invention is designed as an improvement upon the rake patented to me March 17, 1874, No. 148,660; and it has for its object to simplify and improve the construction and manner of operation of said rake, to cheapen its manufacture, and increase its efficiency generally; and to these ends it consists, first, in combining a pivoted rake-head with a stationary clearer; second, in means for locking the parts together, so as to enable the device to be used as an ordinary rake, all as I will now proceed to describe.

In the drawings, A represents an ordinary rake-head, having a central projection, $a$, by which it is riveted to a curved bifurcated shank, B, pivoted to the handle C, as shown in Fig. 1. D is the clearer, riveted to or cast with a shank inserted in the end of the rake-handle, and consisting of a plate provided with perforations $d$, adapted to receive the rake-teeth, as shown in Fig. 1, or of two parallel pieces, as in Fig. 3, the former construction being regarded as preferable. E is a rubber spring-band, inclosing the handle C and pivoted shank B, adapted to keep the rake-head close down against the clearer, with the teeth projecting through the latter. In this position the rake is adapted for operation, and whenever the teeth become clogged a slight pressure in the handle will cause the clearer to descend and completely remove any material that may have accumulated therein.

To enable the rake to be used as one of the ordinary construction, it is only necessary to rigidly secure the rake-head to the clearer, and this may be accomplished by means of a catch, F, pivoted as shown in Figs. 1 and 2, or by other equivalent devices.

Any other form or kind of spring may be substituted for the spring C, if preferred.

I claim as my invention—

1. The rake-head A, secured to the bifurcated pivoted shank B, in combination with the stationary clearer D and spring E, substantially as described, for the purpose specified.

2. In combination with the rake-head A and clearer D, the pivoted catch F, substantially as described, for the purpose specified.

EDMUND BROWN.

Witnesses:
T. E. WALES,
R. S. TAFT.